US008574005B2

(12) United States Patent
Wu et al.

(10) Patent No.: US 8,574,005 B2
(45) Date of Patent: Nov. 5, 2013

(54) UNIVERSAL SERIAL BUS SOCKET

(75) Inventors: Chin-Yi Wu, Taichung (TW);
Sheng-Chung Chen, Hsinchu County (TW)

(73) Assignee: Arcadyan Technology Corporation, Hsinchu (TW)

( * ) Notice: Subject to any disclaimer, the term of this patent is extended or adjusted under 35 U.S.C. 154(b) by 75 days.

(21) Appl. No.: 13/277,570

(22) Filed: Oct. 20, 2011

(65) Prior Publication Data

US 2013/0012073 A1    Jan. 10, 2013

(30) Foreign Application Priority Data

Jul. 5, 2011   (TW) .............................. 100212287 U

(51) Int. Cl.
*H01R 13/60* (2006.01)
(52) U.S. Cl.
USPC ......................................................... 439/536
(58) Field of Classification Search
USPC ........ 439/536, 76.1, 954, 660, 345, 111, 527, 439/576, 567, 569, 540.1, 541.5
See application file for complete search history.

(56) References Cited

U.S. PATENT DOCUMENTS

| 2,427,349 | A | * | 9/1947 | Boynton | 439/536 |
| 4,188,082 | A | * | 2/1980 | Dickey | 439/145 |
| 4,494,815 | A | * | 1/1985 | Brzostek et al. | 439/536 |
| 5,447,441 | A | * | 9/1995 | Mueller et al. | 439/76.1 |
| 6,354,843 | B1 | * | 3/2002 | Kato | 439/34 |
| 7,374,454 | B1 | * | 5/2008 | Wang | 439/536 |
| 7,540,768 | B1 | * | 6/2009 | Wang | 439/536 |
| 2009/0201634 | A1 | * | 8/2009 | Mori et al. | 361/679.4 |

* cited by examiner

*Primary Examiner* — R S Luebke
*Assistant Examiner* — Harshad Patel
(74) *Attorney, Agent, or Firm* — WPAT, PC; Justin King

(57) ABSTRACT

An universal serial bus socket is disclosed, which comprises: a shell, disposed on a planar surface, being formed with a first surface and a second surface at positions corresponding to each other while having a slot to be formed thereon with a length extending in an extending direction forming a first included angle with respect to the planar surface; and an USB connector, being arranged inside the slot while allowing an USB jack of the USB connector to expose outside the first surface of the shell so as to be provided for an USB plug to plug in; wherein the first included angle is not equal to 90 degrees, and the USB plug is arranged to plug into the USB jack in a plug-in direction that forms a second included angle with respect to the planar surface while allowing the second included angle to be not equal to 90 degrees.

9 Claims, 4 Drawing Sheets

UNIVERSAL SERIAL BUS SOCKET

FIELD OF THE INVENTION

The present invention relates to an universal serial bus (USB) socket, and more particularly, to an universal serial bus (USB) socket with a unique jack design, by that the USB jack of its USB connector is tilted by an angle for allowing the plugging of an USB plug into the USB socket to conform to the principle of Ergonomics, and thereby, improving the durability of the USB socket.

BACKGROUND OF THE INVENTION

Universal serial buses (USB), being the most popular transmission means today that can be disposed on various surfaces, can be adapted for almost all kinds of devices that are to be used for different operations, such as data transmission or charging, etc. For those USB sockets that are available today, they are usually being designed for an USB plug to plug into its USB connector in a direction vertical to the surface where it is being disposed. However, ergonomically, we are mostly accustomed to the plugging and pulling of the USB plug in a direction that forms an acute included angle with the surface on which the USB socket is disposed. In another word, the conventional USB sockets that allow a corresponding USB plug to plug in vertically is not conforming to the principle of ergonomic engineering, using which not only the plugging in of the USB plug is not easy to perform, but also both the USB socket and its corresponding USB plug can easily be damaged after being used for a period of time, since in most case, a user is used to and may carelessly force to plug an USB plug into a conventional USB socket in a direction that is not perpendicular thereto.

SUMMARY OF THE INVENTION

In view of the disadvantages of prior art, the primary object of the present invention is to provide an universal serial bus (USB) socket with a unique jack design, by that the USB jack of its USB connector is tilted by an angle for allowing the plugging of an USB plug into the USB socket to conform to the principle of Ergonomics, and thereby, improving the durability of the USB socket.

To achieve the above object, the present invention provides an universal serial bus (USB) socket, comprising: a shell, disposed on a planar surface, being formed with a first surface and a second surface at positions corresponding to each other while having a slot to be formed thereon with a length extending in an extending direction forming a first included angle with respect to the planar surface; an USB connector, being arranged inside the slot while allowing an USB jack of the USB connector to expose outside the first surface of the shell so as to be provided for an USB plug to plug in; and a seat, disposed on the second surface of the shell for allowing the slot to be formed thereat while being formed with a recess at the bottom thereof that is provided for the USB connector to be received therein; wherein, the first included angle is not equal to 90 degrees, and the extending direction of the slot in the condition when the first included angle is smaller than 90 degree is different from the extending direction of the slot in the condition when the first included angle is larger than 90 degrees; the USB plug is arranged to plug into the USB jack in a plug-in direction that forms a second included angle with respect to the planar surface while allowing the second included angle to be not equal to 90 degrees, and the plug-in direction of the condition when the second included angle is smaller than 90 degree is different from the plug-in direction of the condition when the second included angle is larger than 90 degrees; the second included angle is formed smaller than 90 degrees in a condition when the first included angle is smaller than 90 degrees, and vice versa; there is at least one first coupler being arranged on each of the two side walls of the recess, and correspondingly, each of the two sides of the USB connector is formed with at least one second couplers in an amount equal to the first couplers that are arranged on its corresponding side walls and at positions corresponding thereto, and thus, by coupling the first couplers of the recess to their corresponding second couplers of the USB connector, the USB connector is fixedly inset inside the slot.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
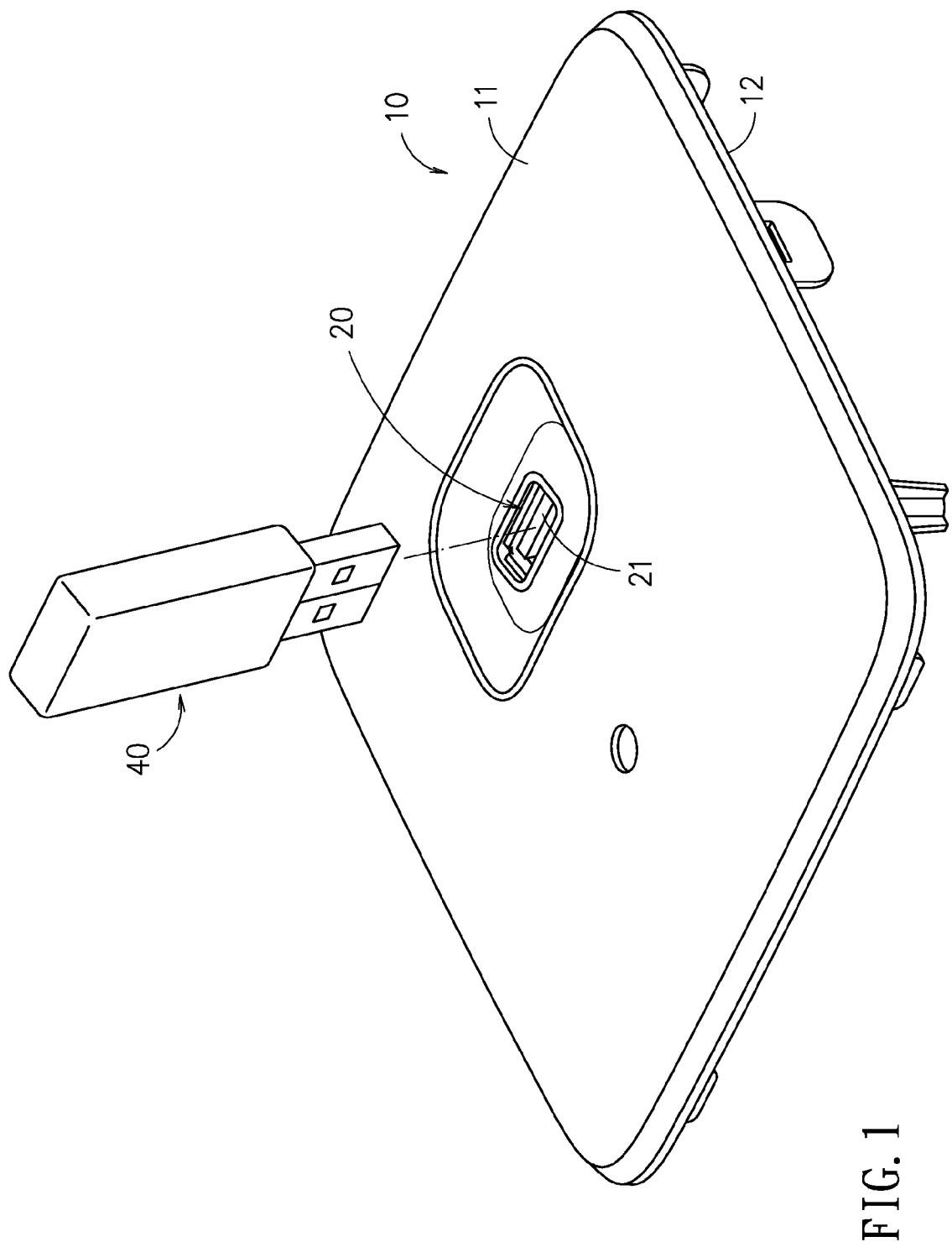
FIG. 1 is a three-dimensional diagram showing an USB socket of the present invention in a direction viewing from the first surface thereof.
Figure 2:
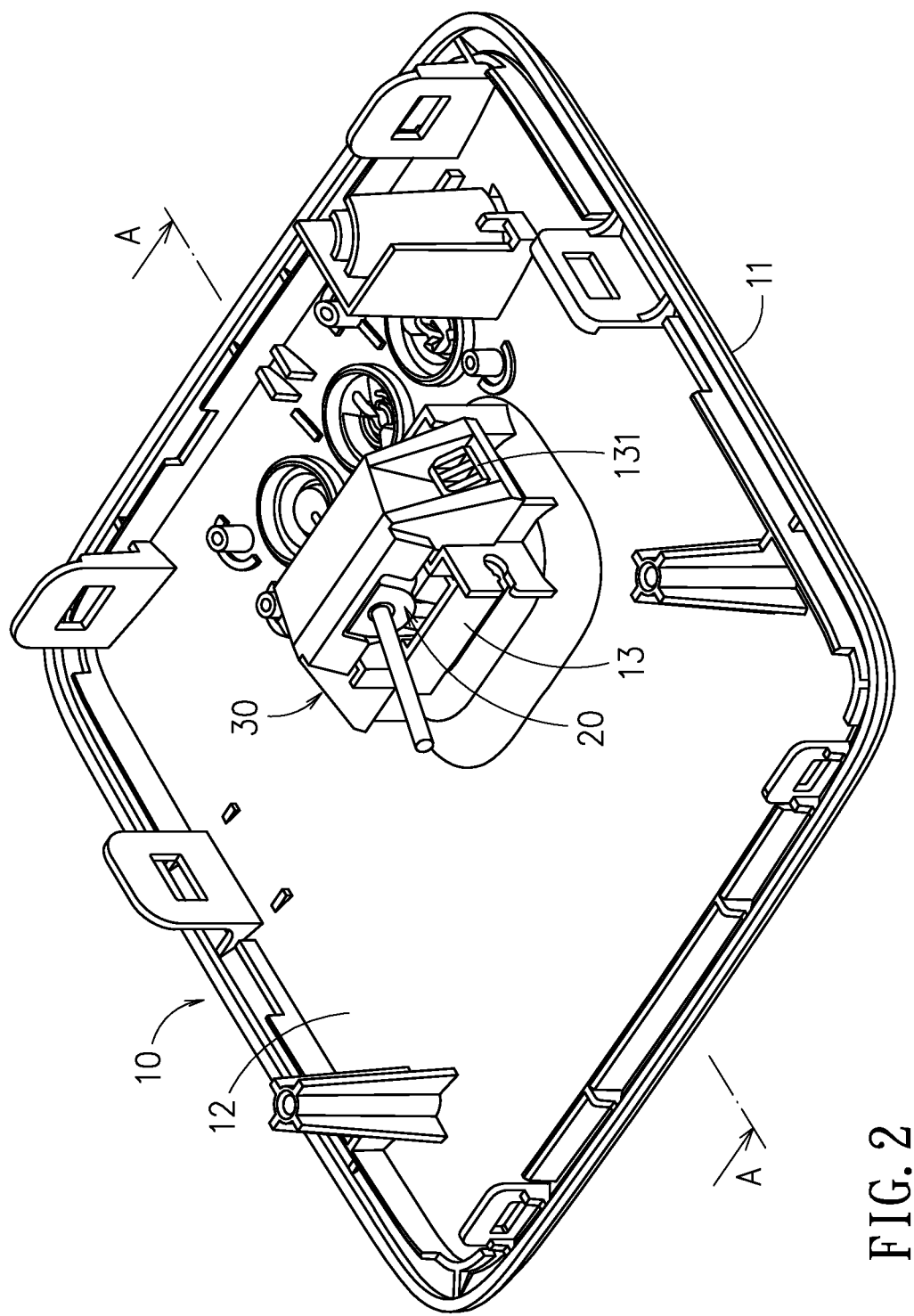
FIG. 2 a three-dimensional diagram showing an USB socket of the present invention in a direction viewing from the second surface thereof.

Please refer to FIG. 1 and FIG. 2, which show an USB socket according to an embodiment of the invention. As shown in FIG. 1 and FIG. 2, an USB socket is composed of a shell 10 and an USB connector 20, in which the shell 10, being adapted for disposing on a planar surface, such as a desktop or a wall surface, is formed with a first surface 11 and a second surface 12 at positions corresponding to each other; and the USB connector 20 is provided for an USB plug 40 to plug therein. In the embodiment shown in FIG. 1, the first surface 11 is substantially the top of the shell 10 while the second surface 12 is the bottom thereof, and thus, when the shell 10 is being place on a surface, the first surface 11 will be exposed on the surface and the second surface 12 is invisible as it is embedded under the surface.

Figure 5:
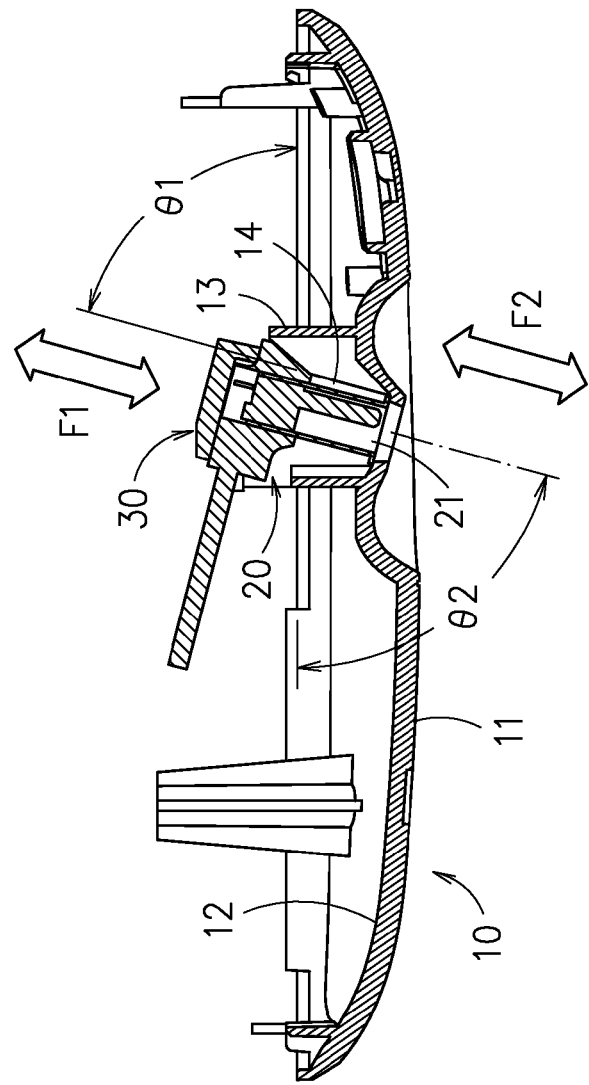
FIG. 5 is an A-A section view of the USB socket of FIG. 2.

As shown in FIG. 2 to FIG. 5, the USB socket further comprises: a seat 13, that is mounted on the second surface 12 in a manner that it is protruding out of the shell 10 by a specific height while being provided for a slot 14 to be formed therein. As shown in FIG. 5, the slot 14 is formed extending in an extending direction F1 that forms a first included angle $\theta_1$ with respect to the planar surface where the shell 10 is disposed thereon, and moreover, the first included angle is formed smaller than 90 degrees in this embodiment. In addition, the USB connector 20, being designed to be arranged inside the slot 14, is configured with an USB jack 21 that is arranged exposing outside the first surface 11 of the shell 10 so as to be provided for an USB plug to plug in. As shown in FIG. 5, the USB plug is arranged to plug into the USB jack 11 in a plug-in direction F2 that forms a second included angle $\theta_2$ with respect to the planar surface where the shell 10 is disposed while allowing the second included angle to be smaller than 90 degrees. Normally, the plug-in direction F2 is extending in a direction conforming to the extending of the extending direction F1 when the USB connector 20 and the slot 14 are assembled correctly, and thus, the second included angle $\theta_2$ will be equal to the first included angle $\theta_1$. It is noted that although the first included angle $\theta_1$ is smaller than 90 degrees in this embodiment, it is not limited thereby and can be formed larger than 90 degree. Moreover, the extending direction F1 in the condition when the first included angle $\theta_1$ is smaller than 90 degree is different from the extending direction F1 in the condition when the first included angle $\theta_1$ is larger than 90 degrees. That is, the first included angle can be any angle that is not equal to 90 degrees.

Figure 3:
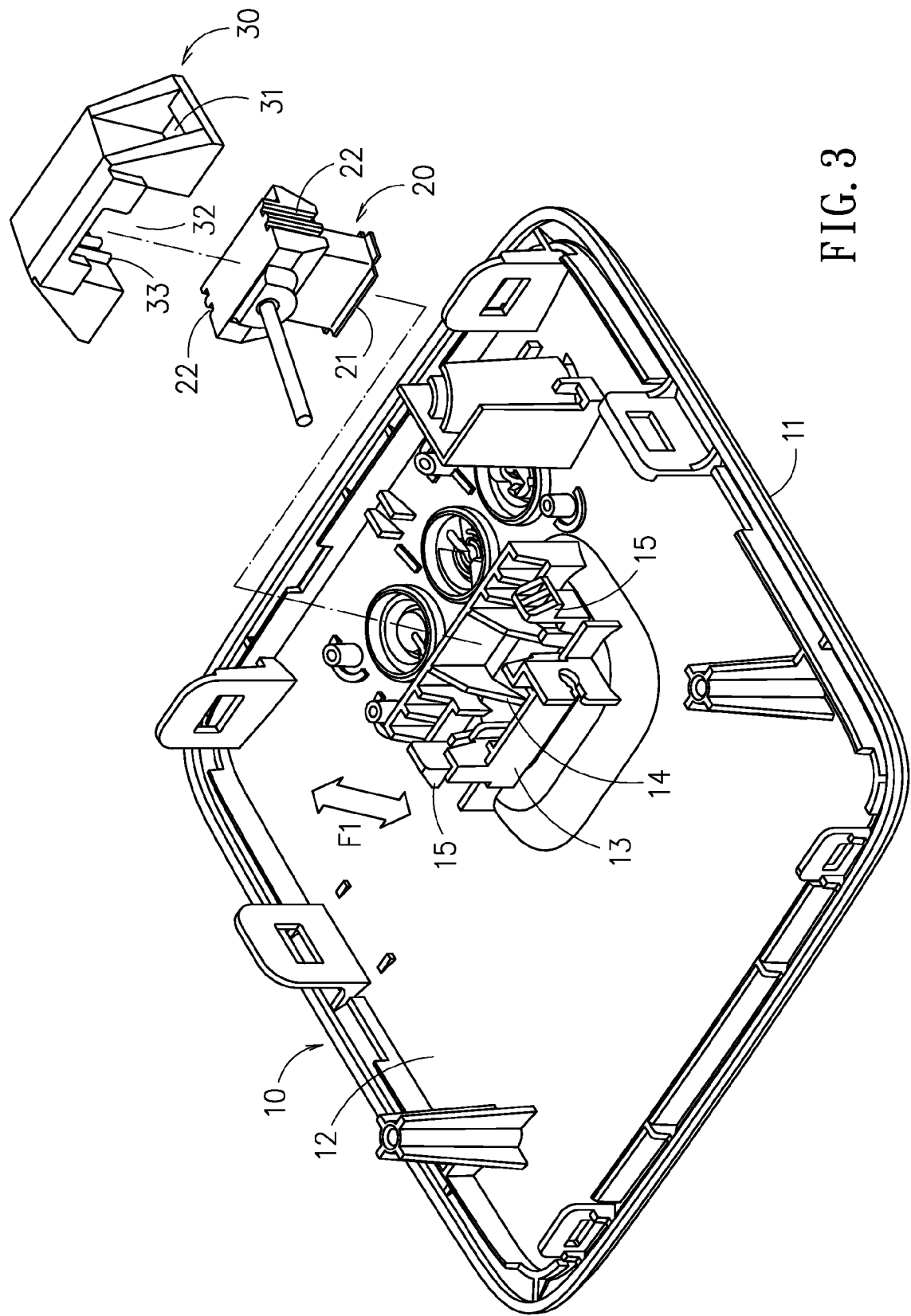
FIG. 3 is an exploded view of an USB socket of the present in a direction viewing from the second surface thereof.
Figure 4:
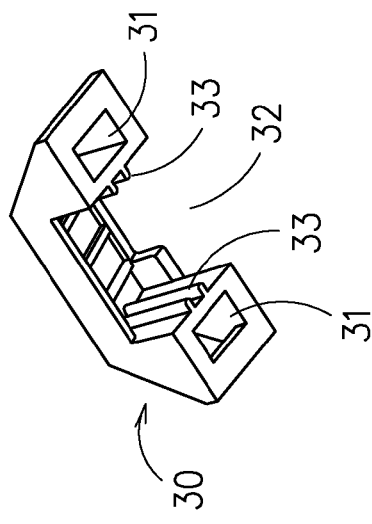
FIG. 4 is a schematic diagram showing a cap that is arranged on the second surface while mating to a seat also arranged thereat.

Moreover, the USB socket further comprises: a cap 30, that is mounted on the second surface 12 at a position corresponding to the seat 13 so as to be mated therewith. As shown in FIG. 3, the cap 30 is further formed with a recess 32 at the bottom thereof while allowing each of the two side walls of the recess 32 to have at least one flange 33 formed thereon, and as there is at least one groove 22 formed respectively on each of the two outer sides of the USB connector 20 at positions corresponding to the flanges 33, the USB connector 20 can be inset and thus received inside the recess 32 by coupling the flanges 33 of the recess 32 to their corresponding grooves 22 of the USB connector 20. In addition, the cap 30 is further formed with at least one insert 31 and the second surface 12 of the shell 10 is further formed with at least one snap 15 at a position corresponding to the at least one insert 31, and thereby, the cap 30 is mated to the seat 13 by the coupling of the at least one insert 31 to its corresponding at least one snap 15 while enabling the USB connector 20 to be fixed inside the slot 14 of the seat by the cap 30.

To sum up, iy the embodiment shown in FIG. 1 to FIG. 5, the present invention provides an ergonomic USB socket with a unique jack design, that is resulting from the inclined slot 14 formed on the seat 13 of its shell 10, by that the USB jack 21 of its USB connector 20 is tilted by an angle for allowing the plugging of an USB plug into the USB socket to conform to the principle of Ergonomics. Experimentally, the best ergonomic angle between the USB jack 21 of the USB connector 20 and the planar surface on which the shell 10 is disposed is an angle ranged between 60 degrees and 80 degrees, by that any user is able to plug an USB plug 20 into the USB socket smoothly. Consequently, not only the operation for plugging of an USB plug into the USB socket can conform to the principle of Ergonomics, but also the durability of the USB socket as the tilt design can prevent the USB socket from being damaged by any careless plugging in or pulling out.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. An universal serial bus (USB) socket, comprising:
   a shell, disposed on a planar surface, being formed with a first surface and a second surface at positions corresponding to each other while having a slot formed thereon with a length extending in an extending direction forming a first included angle with respect to the planar surface; and
   an USB connector, being arranged inside the slot while allowing an USB jack of the USB connector to expose outside the first surface of the shell so as to be provided for an USB plug to plug in;
   a seat, mounted on the second surface in a manner that it is protruding out of the shell by a specific height while being provided for the slot to be formed therein; and
   a cap, mounted on the second surface at a position corresponding to the seat so as to be mated therewith and thus to be used for fixing the USB connector to the slot of the seat;
   wherein, the first included angle is not equal to 90 degrees; and the USB plug is arranged to plug into the USB jack in a plug-in direction that forms a second included angle with respect to the planar surface while allowing the second included angle to be not equal to 90 degrees.

2. The universal serial bus (USB) socket of claim 1, wherein the second included angle is smaller than 90 degrees.

3. The universal serial bus (USB) socket of claim 1, wherein the second included angle is equal to the first included angle.

4. The universal serial bus (USB) socket of claim 1, wherein the cap is further formed with at least one insert and the second surface of the shell is further formed with at least one snap at a position corresponding to the at least one insert, and thereby, the cap is mated to the seat by the coupling of the at least one insert to its corresponding at least one snap.

5. The universal serial bus (USB) socket of claim 1, wherein the cap is further formed with a recess at the bottom thereof while allowing each of two side walls of the recess to have at least one flange formed thereon, and there is at least one groove formed respectively on each of two side walls of the USB connector at positions corresponding to the flanges, and consequently, by coupling the flanges of the recess to their corresponding grooves of the USB connector, the USB connector is received inside the recess.

6. An universal serial bus (USB) socket, comprising:
   a shell, disposed on a planar surface, being formed with a first surface and a second surface at positions corresponding to each other while having a slot formed thereon with a length extending in an extending direction forming a first included angle with respect to the planar surface;
   an USB connector, being arranged inside the slot while allowing an USB jack of the USB connector to expose outside the first surface of the shell so as to be provided for an USB plug to plug in;
   a seat, disposed on the second surface of the shell for allowing the slot to be formed thereat while being formed with a recess provided for the USB connector to be received therein; and
   a cap, mounted on the second surface at a position corresponding to the seat so as to be mated therewith and thus to be used for fixing the USB connector to the slot of the seat;

wherein, the first included angle is not equal to 90 degrees; and the USB plug is arranged to plug into the USB jack in a plug-in direction that forms a second included angle with respect to the planar surface while allowing the second included angle to be not equal to 90 degrees; and there is at least one first coupler being arranged on each of two side walls of the recess, and correspondingly, each of two side walls of the USB connector is formed with at least one second couplers in an amount equal to the first couplers that are arranged on its corresponding side walls and at positions corresponding thereto, and thus, by coupling the first couplers of the recess to their corresponding second couplers of the USB connector, the USB connector is fixedly inset inside the slot.

7. The universal serial bus (USB) socket of claim 6, wherein the second included angle is smaller than 90 degrees.

8. The universal serial bus (USB) socket of claim 6, wherein the second included angle is equal to the first included angle.

9. The universal serial bus (USB) socket of claim 6, wherein the seat is further formed with at least one insert and the second surface of the shell is further formed with at least one snap at a position corresponding to the at least one insert, and thereby, the seat is coupled to the second surface of the shell by the coupling of the at least one insert to its corresponding at least one snap.

* * * * *